(No Model.)

W. W. ROGERS.
CAR COUPLING.

No. 402,973. Patented May 7, 1889.

WITNESSES:
R. A. Balderson
M. E. Lansdale

INVENTOR.
William W. Rogers
John S. Duffie
ATTORNEY

UNITED STATES PATENT OFFICE.

WILLIAM WAYNE ROGERS, OF CLARKSVILLE, ARKANSAS.

CAR-COUPLING.

SPECIFICATION forming part of Letters Patent No. 402,973, dated May 7, 1889.

Application filed February 4, 1889. Serial No. 298,582. (No model.)

*To all whom it may concern:*

Be it known that I, WILLIAM WAYNE ROGERS, a citizen of the United States, residing at Clarksville, in the county of Johnson and State of Arkansas, have invented certain new and useful Improvements in Automatic Car-Coupling-Pin Extractors and Car-Couplers and Car Draw-Heads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to car-couplers; and it consists in the novel construction and arrangement of its parts.

Figure 1:
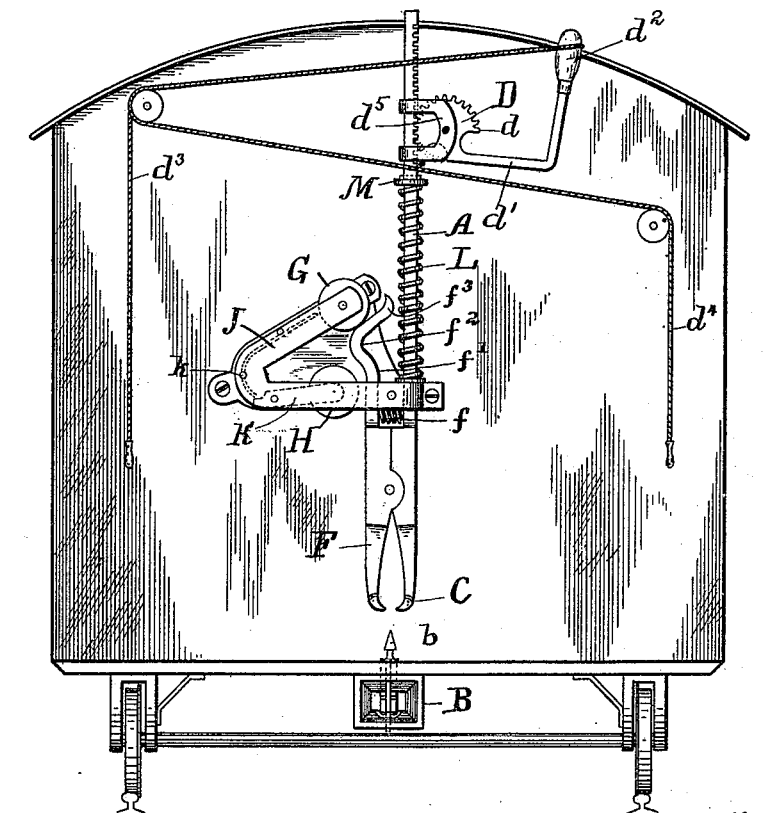
Figure 2:
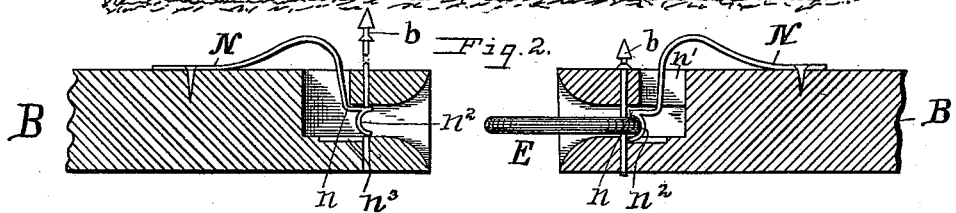
Figure 3:
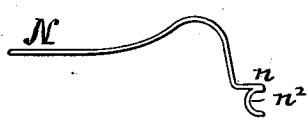
Figure 4:
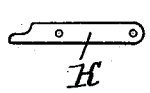
Figure 5:
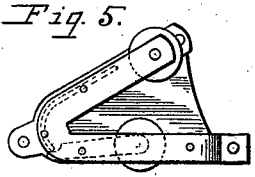
Figure 6:
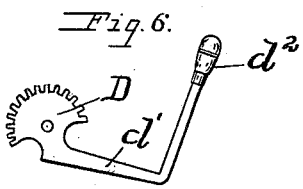
Figure 7:

Figure 1 is an end elevation of a car with my coupler attached thereto. Fig. 2 is a sectional view of the draw-heads with the springs, pins, and link in place. Figs. 3, 4, 5, 6, and 7 are detail views.

My invention is described as follows: A long bar, A, as shown in Fig. 1, reaches from immediately over the draw-head B to the top of the car. The lower end of said bar is so curved and shaped as to form one-half of a pair of nippers, C, for the purpose of taking hold of and extracting the coupling-pin $b$. These nippers C are made sufficiently broad to catch the said pin in any position it may assume in the draw-head.

The upper end of the bar A is provided with cogs $a$, which mesh with the cogs $d$ on the half-wheel D. This half-wheel D is provided with an arm, $d'$, handle $d^2$, and cords $d^3$ $d^4$. Said half-wheel and bar are held in place by a cuff, $d^5$. Wheel D is designed for the purpose of moving the said bar A and nippers C up and down, said nippers operating to grasp the said coupling-pin and draw it up until it is out of the link E, but not quite out of the draw-head, and then let it loose, as hereinafter explained. The said wheel D may be operated from the top of the car by the handle $d^2$ or from either side by the cords $d^3$ $d^4$, which run over pulleys, causing said cords to hang nearly to the outer edges of the car. The short bar F of the nippers C has its lower end curved and shaped to act in conjunction with the lower end of the bar A, and unites therewith to form the said nippers. The said bars A and F are cut back a short distance above the said nippers, in order to give room for the play of the spiral spring $f$. The office of said spring is to force open the upper ends of the bars A and F, and thereby close the nippers C and cause them to catch and hold the coupling-pin $b$. The said bar F curves outwardly from the point indicated by $f'$, forming the curve indicated by $f^2$, and then inwardly again to the curve indicated by $f^3$. The object of these curves is to properly regulate the action of the said bar F, which impinges against the wheels G and H. Said wheels are pivoted in a slotted elbow-frame, J, which is secured to the end of the car. The upper wheel, G, is stationary and serves to move the upper end of the bar F toward the bar A, thereby causing the nippers C to open and turn loose the said coupling-pin when drawn from the draw-head.

The wheel H is pivoted in one end of a slotted bar, K, which bar is pivoted at its center in the lower arm of the said slotted elbow-bar J. Said wheel H and the inner end of said slotted bar K may, by the action of the bar F, be moved upward to any degree, but not downward below a horizontal plane, as its outer end is arranged to impinge against a pin, $k$, or the filling between the upper and lower parts of said elbow-bar. The office of the said wheel H is to move the upper end of the bar F toward the bar A as the nippers C are pressed downwardly, and thereby force open the mouth of the nippers ready to grasp the said pin.

The large coil-spring L is coiled round the bar A, its lower end resting on a plate on the lower arm of the slotted frame J and its upper end against the lower face of the plate M, which is secured to the said bar A. Said spring is sufficiently strong to, and will of itself, force the said nippers upward and withdraw the coupling-pin from the coupling-link E, but will not entirely withdraw it from the draw-head.

When the nippers C go down to grasp the pin the curve $f^2$ impinges the wheel H and causes the nippers C to open to receive the pin, and when it passes said wheel, said wheel flies up and said nippers close with a snap and grasp the neck of said pin between its upper and lower heads, b, and as the nippers rise, holding the pin, the wheel H allows curve $f^2$ to pass it without opening the nippers; but when said curve strikes the wheel G the nippers are opened and the pin is released just before it is entirely withdrawn from the draw-head, and drops back on the table n of the spring N, which has just sprung out and taken its place under the pin-hole. The spring N has its straight end bolted to the upper face of the draw-head. It then bends upward and then downward through a slot, $n'$, into the mouth of the said draw-head, and is provided with a table, n, for holding the pin, as above described; and just below the table it is also provided with a shoe, $n^2$, which holds one end of the link in it and causes it to stand straight out, so as to enter the mouth of the abutting draw-head. Said draw-head is provided with a depression, $n^3$, into which the lower end of said shoe enters, so that when the link passes into the mouth of the draw-head it will not catch against the lower end of said shoe, but pass into the same, as above described, and push the said spring back from under the pin b, when said pin immediately drops down and passes through the said link, and thus the cars are coupled together.

Having described my invention, what I claim as new, and desire to secure by Letters Patent, is—

1. The combination of the bar A, provided at its upper end with cogs a, cog-wheel D, properly secured and provided with cogs d, arm $d'$, handle $d^2$, cords $d^3$ $d^4$, to operate the same, coil-spring L, adapted to raise said bar, bar F, constructed as described, to form, in conjunction with said bar A, nippers C, coil-spring f, adapted to close said nippers, the upper end of said bar being curved, as described, wheel G, pivoted in slotted frame J, wheel H, pivoted in bar K, and bar K, pivoted in said frame J, substantially as shown and described, and for the purposes set forth.

2. The combination of the draw-head having, in addition to the usual mouth, the slot $n'$ and depression $n^3$, spring N, its flat end secured to the upper face of said draw-head, its bent end passing down through said slot $n'$ and provided with the table n and the shoe $n^2$, link E, adapted to work in said draw-head and operate said spring, and pin b, adapted to operate in said draw-head and to be extracted by said nippers C, all substantially as shown and described, and for the purposes set forth.

3. The combination of the nippers C, provided with the cogs and operating-wheel D, large coil-spring L, small coil-spring f, and curves on the bar F, and wheels G H in suitable bearings, all as described, with a draw-head provided with the slot $n'$, recess $n^3$, spring N, provided with the table n and shoe $n^2$, and the double-headed pin b, substantially as shown and described, and for the purposes set forth.

4. In a car-coupler, substantially as above described, the combination of the draw-head having, in addition to its mouth, the slot $n'$ and recess $n^3$, spring N, having one end secured to the upper face of said draw-head, the other passing down through the slot $n'$ and into the mouth of the said draw-head and being provided with a table, n, and shoe $n^2$, and the double-headed coupling-pin b, which may be drawn up by means of a cord and branches, all substantially as shown and described, and for the purposes set forth.

In testimony whereof I affix my signature in presence of two witnesses.

WILLIAM WAYNE ROGERS.

Witnesses:
J. W. COFFMAN,
G. G. LOGAN.